(No Model.)
J. VAN RUYMBEKE.
PROCESS OF MAKING PHOSPHORIC ACID.
No. 540,124. Patented May 28, 1895.
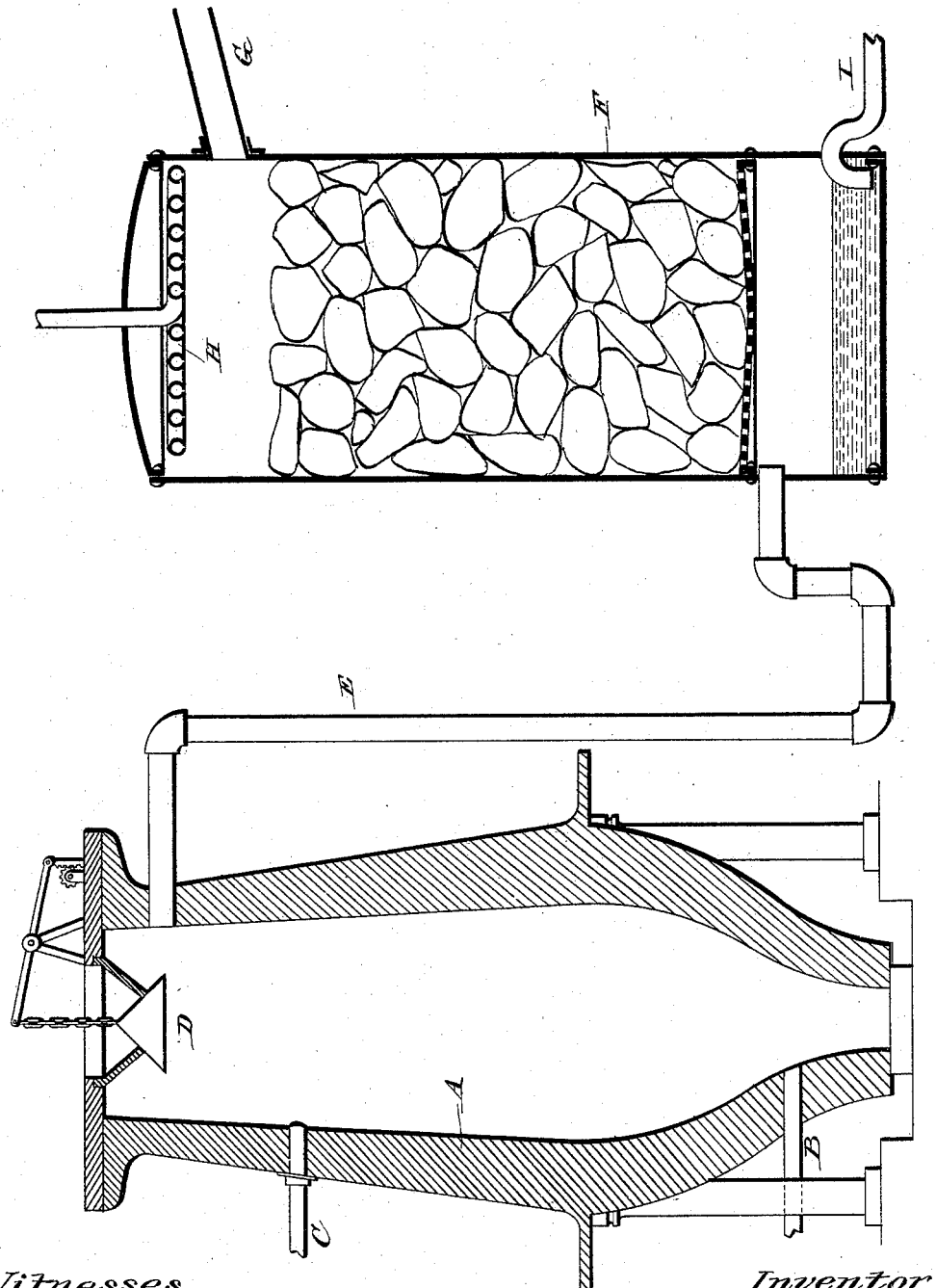
Witnesses.
Inventor
Joseph Van Ruymbeke
by Coburn & Thacher. Attys.
by Frank L. Dyer
Associate Atty.

UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF MAKING PHOSPHORIC ACID.

SPECIFICATION forming part of Letters Patent No. 540,124, dated May 28, 1895.

Application filed February 24, 1891. Serial No. 382,612. (No specimens.)

*To all whom it may concern:*

Be it known that I, JOSEPH VAN RUYMBEKE, a subject of the King of Belgium, residing at Chicago, in the county of Cook and State of Illinois, have invented certain new and useful Improvements in Processes of Obtaining Phosphoric Acid, which are fully set forth in the following specification.

This invention relates to a process of preparing phosphoric acid, principally from mineral phosphates.

In carrying this process into effect, I make use of an apparatus such as is shown in the accompanying drawing, and in which A represents the body of a blast furnace; B, a tuyere pipe; C, an air pipe in the upper part of the furnace; D, an ordinary cup and cone charging device; E, a delivery pipe from the furnace connected with a scrubber F, which is provided with an outlet pipe for the gases G, a spray pipe H for delivering water, and an outlet pipe I for the dilute acid produced.

In carrying out my process, a natural phosphate is mixed with an acid flux and a reducing agent. The mixture is heated exactly as in an ordinary blast furnace, and the operation continues until substantially all the available phosphorus has been distilled off. This phosphorus is oxidized by means of air introduced by the air pipe C in the upper part of the furnace, and is thus converted into phosphorus pentoxid, which passes with the gases through the pipe E into the lower part of the scrubber F, through which water is passed, and by which the pentoxid is converted into an aqueous solution of phosphoric acid. In adding the flux to the natural phosphate, such proportions are selected as will produce a slag of low melting point. From the scrubber, the diluted solution of phosphoric acid runs off through the pipe I.

Phosphoric acid of any desired strength may be obtained by concentration of the aqueous solution.

I will now describe a practical way of carrying this process into effect, using for this purpose what is known as Carolina rock. Take of the rock one thousand pounds and add thereto five hundred pounds of clay. Good common clay will answer. The furnace is now charged with coke, of which at least three hundred pounds should be used for the charge above mentioned. The furnace is now heated in the ordinary way, a blast being introduced through the pipe or pipes, and the combustion is continued until a bed of hot coke is formed in the bottom of the furnace. The charge of phosphate rock and clay is now introduced into the furnace by means of the cup and cone charging arrangement D. The blast is now put on, and as the mixture becomes heated, the mass melts and passes through the bed of hot coke. The effect is to liberate the phosphorus while the resulting slag runs to the bottom of the furnace and is tapped from time to time, like ordinary slag from a blast furnace. The products of combustion and the liberated phosphorus pass to the upper part of the furnace, and the phosphorus is converted into phosphorus pentoxid, being carried mechanically with the products of combustion through the pipe E. From time to time a new charge of coke of about three hundred pounds is introduced, followed by a charge of phosphate rock and clay in the proportions specified above. The slag which runs to the bottom of the furnace will not usually contain more than ten per cent. of the phosphoric acid in the mass.

In place of coke, any other material suitable for the purpose may be used as a reducing agent, such as anthracite coal.

Although I have shown a particular form of apparatus wherewith to carry out my process, yet I do not wish to limit myself thereto, as other forms or modifications of the apparatus may be used for the purpose; nor do I wish to limit myself to the treatment of any particular phosphate, or the use of any special acid flux, as other fluxes may be used beside clay, such as sand or bauxite, the selection being made so as to obtain a flux of the greatest fusibility as above stated. It is also to be understood, that the proportions may be varied according as the judgment or practice of the process may indicate.

What I claim is—

1. The process of obtaining phosphoric acid, which consists in submitting a mixture of phosphate and acid flux to the action of heat in the presence of a reducing agent whereby phosphorus is produced and is carried off with the products of combustion, then in subjecting the phosphorus vapors to the action of air in sufficient quantity to oxidize the vapors into phosphorus pentoxid, and then in collecting the phosphorus pentoxid in water, substantially as set forth.

2. The process of obtaining phosphoric acid, which consists in submitting a mixture of phosphate and acid flux to the action of heat in the presence of a reducing agent whereby phosphorus is produced and is carried off with the products of combustion, then in subjecting the phosphorus vapors to the action of air in sufficient quantity to oxidize the vapors into phosphorus pentoxid, then in collecting the phosphorus pentoxid in water, and finally in concentrating the liquid until the desired density is obtained, substantially as set forth.

3. The process of obtaining phosphoric acid, which consists in submitting a mixture of natural phosphate and clay to the action of heat in the presence of a reducing agent whereby phosphorus is produced and is carried off with the products of combustion, then in subjecting the phosphorus vapors to the action of air in sufficient quantity to oxidize the vapors into phosphorus pentoxid, then in collecting the phosphorus pentoxid in water, and finally in concentrating the liquid until the desired density is obtained, substantially as set forth.

JOSEPH VAN RUYMBEKE.

Witnesses:
A. M. BEST,
CARRIE FEIGEL.